United States Patent [19]

Sekula et al.

[11] 4,442,499

[45] Apr. 10, 1984

[54] DEVICE AND METHOD FOR PRODUCING PNEUMATIC TIRES HAVING PRESELECTED NOISE CHARACTERISTICS

[75] Inventors: Paul J. Sekula, Mogadore, Ohio; Gerald R. Potts, Edina, Minn.

[73] Assignee: The Firestone Tire & Rubber Company, Akron, Ohio

[21] Appl. No.: 345,195

[22] Filed: Feb. 2, 1982

Related U.S. Application Data

[62] Division of Ser. No. 199,678, Oct. 22, 1980, abandoned.

[51] Int. Cl.$^3$ ............................................. B60C 11/10
[52] U.S. Cl. .............................. 364/574; 152/209 R; 364/576
[58] Field of Search ................................ 364/574, 576; 152/209 R, 209 D, 330 R, 343, 374; 156/110 R

[56] References Cited

U.S. PATENT DOCUMENTS

| | | | |
|---|---|---|---|
| 2,878,852 | 3/1959 | Lippmann et al. | 152/209 |
| 3,490,277 | 1/1970 | Sanders et al. | 364/576 |
| 3,926,238 | 12/1975 | Vorih | 152/209 |
| 3,989,780 | 11/1976 | Vorih | 264/40.1 |
| 4,178,199 | 12/1979 | Lippman et al. | 156/110 |
| 4,327,792 | 5/1982 | Landers | 152/209 R |
| 4,369,825 | 1/1983 | Nilsson | 152/209 R |

OTHER PUBLICATIONS

M. G. Richards, *Automotive Tire Noise—A Comprehensive Study*, Sound and Vibration, May 1974, pp. 42–47.
John H. Varterasian, *Quieting Noise Mathematically—Its Application to Snow Tires*, Society of Automotive Engineers, Paper No. 690520, May 19, 1969.
P. R. Willett, *Tire Tread Pattern Sound Generation*, Tire Science and Technology, TSTCA, vol. 3, No. 4, Nov. 1975, pp. 252–266.

*Primary Examiner*—Errol A. Krass
*Attorney, Agent, or Firm*—Ernst H. Ruf

[57] ABSTRACT

A device (10) and embodied method for producing pneumatic tires having preselected noise characteristics includes an output spectrum generator (11) for generating those noise characteristics, a fast Fourier transformer (12) for generating the periodic function which yields the desired noise characteristics, and a processing circuit (13). Processing circuit (13) substantially proportionally adjusts the magnitude of this periodic function such that its relative amplitude at various points in time throughout one period is directly substantially proportional to the length ($L_1 \ldots L_8$) of individual tread pitch elements ($P_1 \ldots P_8$) at similarly spaced locations along the tire circumference, all as may be embodied in a pneumatic tire produced in accordance with the described method.

16 Claims, 10 Drawing Figures

DEVICE AND METHOD FOR PRODUCING PNEUMATIC TIRES HAVING PRESELECTED NOISE CHARACTERISTICS

CROSS-REFERENCE TO RELATED APPLICATION

This application is a division of U.S. Ser. No. 199,678, filed Oct. 22, 1980, now abandoned.

TECHNICAL FIELD

The present invention relates generally to pneumatic tires. More particularly, the present invention pertains to noise generated by pneumatic tires as they rotate and engage a road surface. Still more specifically, the present invention contemplates a device and method which produces a tread element design for pneumatic tires that generates a preselected audio frequency spectrum as it engages a road surface.

BACKGROUND ART

As a tire rotationally engages a roadway its individual tread design elements cause disturbances in surrounding air molecules, generating sounds in the audio frequency spectrum. The geometry of the individual tread design elements, commonly known as pitches or pitch elements, has been found to control those specific frequencies at which sounds are generated and the relative energy content (i.e., amplitude) of each such frequency. Where pitches of constant dimensions have been used to completely surround a pneumatic tire, the majority of the energy occurs at a single resonant frequency and harmonics of that frequency. This tonal concentration is highly disturbing to the occupants of the vehicle on which the tire is mounted.

Efforts along two basic lines have been taken to ameliorate the objectionable noise generated by rotating pneumatic tires. Some have attempted to modulate deleterious noise producing frequencies by sequencing pitch elements randomly or in accordance with preselected algebraic or trigonometric relations. For example, in the publication "Quieting Noise Mathematically—Its Application to Snow Tires" (S.A.E. Paper No. 690520) a mathematical method is disclosed for modifying the location of particular tread elements to more uniformly distribute audio noise throughout the frequency spectrum. Others have varied the pitch lengths on individual pitch elements again in a random or preselected algebraic or trigonometric manner. Most recently work has been done in simultaneously utilizing both techniques, as exemplified by Great Britain patent application No. 2,014,520A and U.S. Pat. No. 3,926,238.

The principal deficiency of the prior art has been the necessity for design by trial and error. Heretofore a tread pattern had to be built and tested before its exact noise characteristics were known. Indeed, in a very recent U.S. Pat. No. 4,178,199, the method used to reduce the amount of noise generated by a particular tread pattern required comparison to a tread pattern whose audio excitation frequencies were previously ascertained. In short, there does not appear to exist any device or method for obtaining the tread pattern required to generate a preselected audio output spectrum.

DISCLOSURE OF INVENTION

It is, therefore, an advantage of the invention to provide a device and method for obtaining a tread pattern for a pneumatic tire which minimizes acoustic noise in a preselected fashion.

It is a further advantage of the invention to provide a device and method, as above, in which a tread pattern having preselected noise characteristics may be obtained without empirical testing and trial and error procedures.

It is still a further advantage of the invention to provide a device and method, as above, in which specific lengths are ascertained for individual pitch elements to generate the preselected noise characteristics.

These and other features and advantages of the present invention over existing prior art forms will become more apparent and fully understood from the following description in conjunction with the accompanying drawings.

In general, the present invention contemplates a device for producing a design element pattern of a preselected total length for a load supporting apparatus, the apparatus having a preselected, periodic audio frequency spectrum signal, and the design element pattern including a plurality of individual design elements of varying lengths. The device includes a generator for generating the preselected audio frequency spectrum signal, an inverse Fourier transformer receiving the preselected, periodic audio frequency spectrum signal and generating an inverse Fourier transform signal thereof, and a processing circuit receiving the inverse Fourier transform signal and generating a periodic signal the period of which is proportional to the preselected total length for the design element pattern and the relative amplitude of which at various points in time throughout one period is proportional to the length of the individual design elements at similarly spaced locations over the preselected total length for the design element pattern.

The present invention also contemplates a method for generating a design element pattern of a preselected total length for a load supporting apparatus, the apparatus having a preselected, periodic audio frequency spectrum signal, and the design element pattern including a plurality of individual design elements of varying lengths. The method includes the steps of generating the preselected audio frequency spectrum signal, generating an inverse Fourier transform signal of the preselected, periodic audio frequency spectrum signal, and, proportionally adjusting the inverse Fourier transform signal such that its signal has a period proportional to the preselected total length for the design element pattern and has a relative amplitude at various points in time throughout one period that is proportional to the length of the individual design elements at similarly spaced locations over the preselected total length for the design element pattern.

PREFERRED EMBODIMENT FOR CARRYING OUT THE INVENTION

Figure 1:
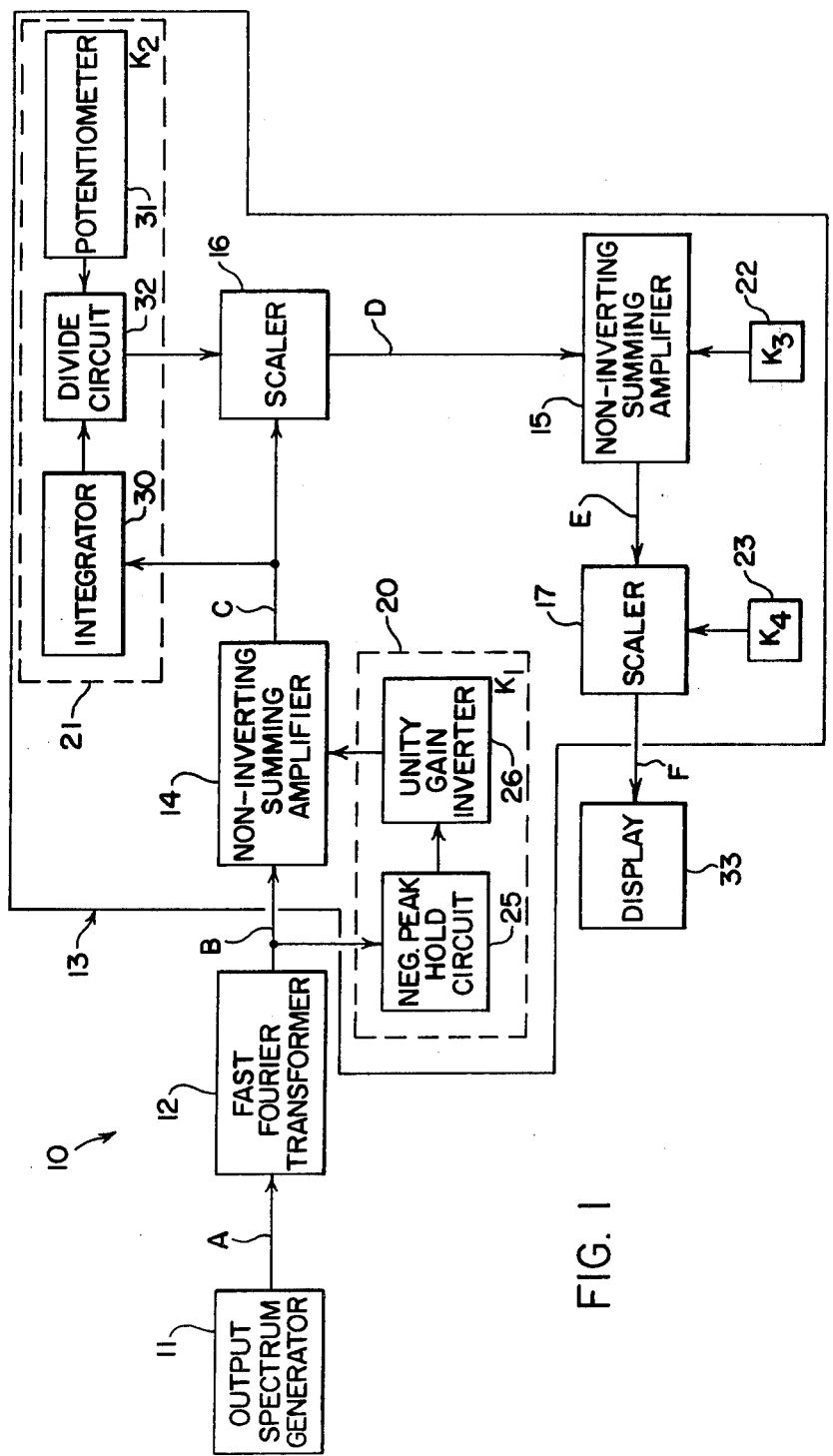
FIG. 1 is a block diagram of an exemplary device according to the concept of the present invention, and depicts in block diagram form further circuitry suitable for generating various constants noted hereinbelow.

FIG. 1 illustrates a device generally indicated by the numeral 10, which also embodies a method for producing a tread pitch pattern for a pneumatic tire having a preselected, periodic audio frequency spectrum signal. Device 10 broadly includes output spectrum generator 11, fast Fourier transformer 12, and processing circuit 13.

Output spectrum generator 11 may be any device or circuit which generates a periodic electrical signal having the desired preselected, periodic audio frequency spectrum. By way of example and not limitation, it is often found preferable for pneumatic tires to generate a so-called "white-noise" audio spectrum in which energy is present at all frequencies in equal magnitudes, as illustrated in FIG. 2A. Such a spectrum is similar to the constant sounds heard through a seashell and has been found to be the least annoying to vehicle passengers. Where a white-noise audio spectrum is desired, any of the well-known circuits for generating that spectral distribution may be utilized as output spectrum generator 11. The ordinarily skilled artisan will appreciate the ease with which any desired audio spectrum signal may be generated, should one other than white-noise be of interest.

Fast Fourier transformer 12, which receives the output signal from output spectrum generator 11, may be any device or circuit which generates an inverse Fourier transform signal thereof. There exist several commercially available units which are acceptable for use herein such as Model 5451 manufactured by The Hewlett-Packard Company of Palo Alto, Calif. which is capable of both forward and inverse Fourier transformations. FIG. 2B depicts a single period of the inverse Fourier transform signal of the white-noise signal spectrum shown in FIG. 2A.

Processing circuit 13 serves to proportionally adjust the inverse Fourier transform signal by four constants as explained below. Processing circuit 13 includes two conventional non-inverting summing amplifiers 14 and 15, two scalers 16 and 17, and four constant voltage sources 20, 21, 22 and 23 respectively providing constants $K_1$, $K_2$, $K_3$ and $K_4$. Exemplary circuitry for generating $K_1$ is shown to include negative peak hold circuit 25 and unity gain inverter 26 while exemplary circuitry for generating $K_2$ includes an integrator 30, a potentiometer 31 and a divide circuit 32.

Figure 2:
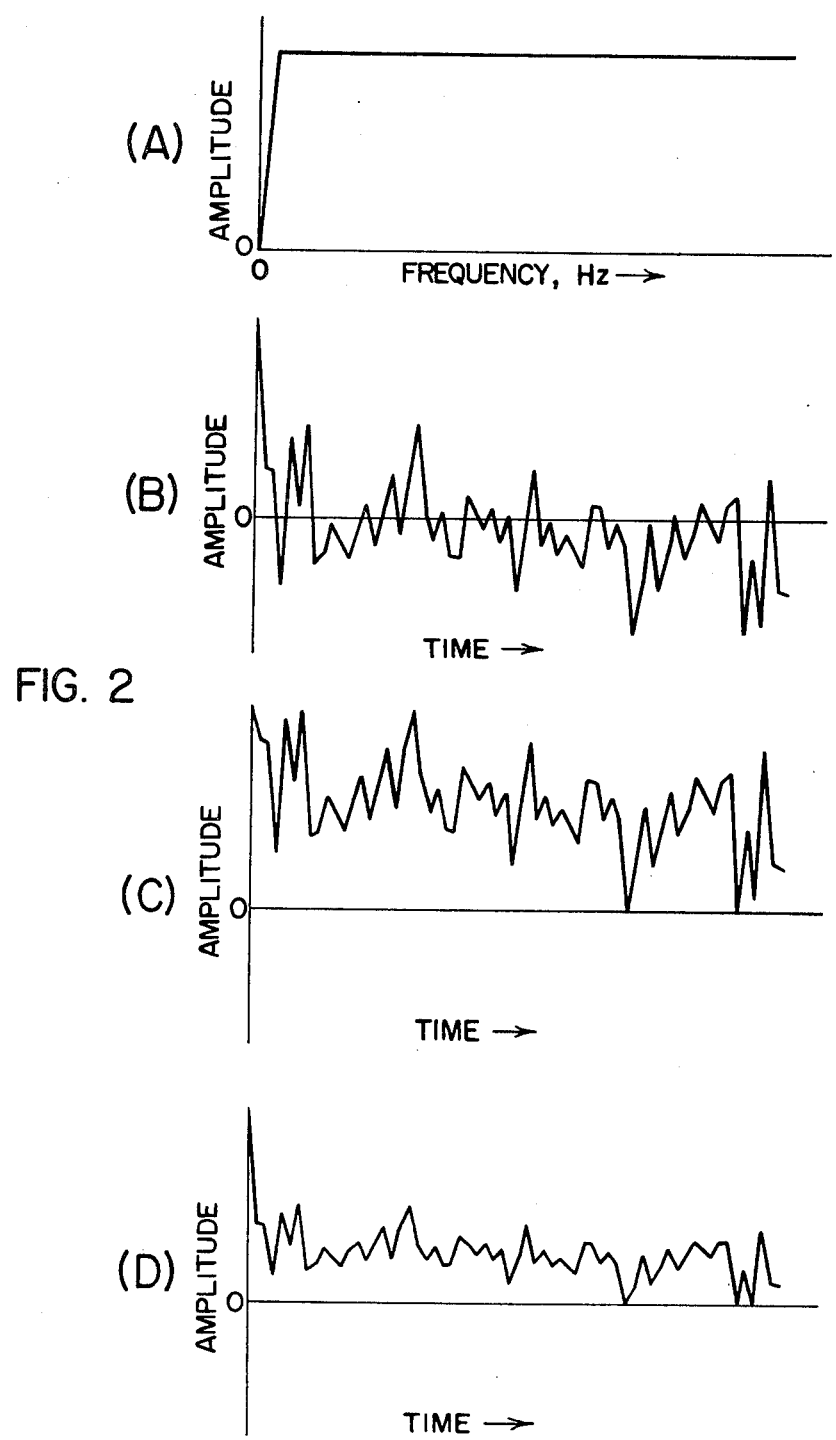
FIGS. 2A-G, contained on drawing sheets 2 and 3, is a schematic representation of voltage waveforms (each having different letter designations) at various points (having like letter designations) in the device shown in FIG. 1. Waveforms B through F, inclusive, are coordinated in time and have the same relative amplitude scales. Waveforms A and G are neither necessarily coordinated in time nor in amplitude with each other or any of the remaining waveforms in FIG. 2, although waveform G is a magnified view of waveform F near its origin.
Figure 2:
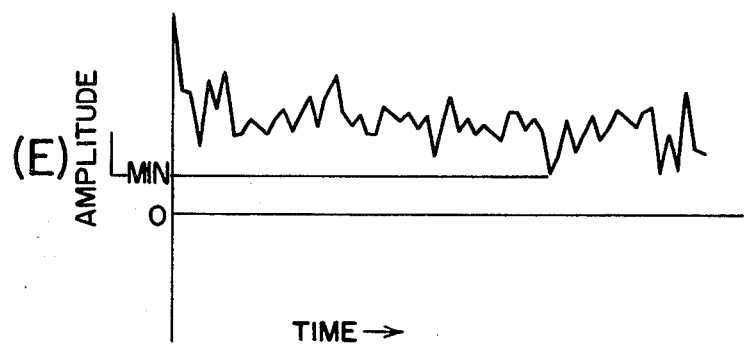
Figure 2:
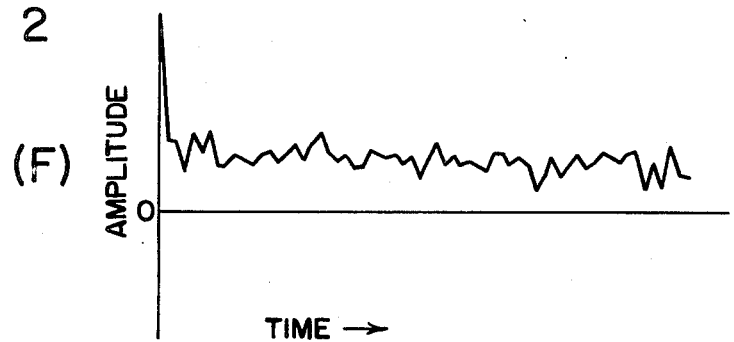

Non-inverting summing amplifier 14, which may be a conventional operational amplifier receiving its inputs at its non-inverting terminal, receives both the inverse Fourier transform signal B and the constant voltage signal $K_1$, and adds the same to obtain waveform C in FIG. 2. Negative peak hold circuit 25 also receives the inverse Fourier transform signal B, and monitors for and holds the maximum negative voltage amplitude achieved by signal B. This maximum negative voltage amplitude is received and made positive by unity gain inverter 26, whose output in turn is received by non-inverting summing amplifier 14 as the constant voltage signal $K_1$.

Scaler 16, which may be a conventional multiplier, receives both the output signal C from non-inverting summing amplifier 14 and the constant voltage signal $K_2$, and multiplies waveform C by the constant voltage signal $K_2$. Integrator 30 also receives waveform C from noninverting summing amplifier 14 and integrates the same over its period. The output signal from integrator 30 is received by a conventional divide circuit 32, which also receives a preselected constant voltage output from potentiometer 31. Divide circuit 32 divides the output signal from integrator 30 into the preselected constant voltage output from potentiometer 31 and furnishes the resultant signal to scaler 16 as the constant voltage signal $K_2$.

In a similar manner to that described above, noninverting summing amplifier 15 receives and adds both the output signal from scaler 16, shown as waveform D in FIG. 2, with another preselected constant voltage $K_3$. The output signal from non-inverting summing amplifier 15, illustrated as waveform E in FIG. 2, is received by scaler 17 which multiplies this signal by the constant voltage signal $K_4$ to achieve the output waveform F in FIG. 2. Waveform F may, where desired, be displayed on a display 33 such as an oscilloscope or other hard-copy signal recorder.

Having described the construction of device 10, its operation may be delineated. However, in order to more fully appreciate the various facets to the operation of device 10, it is helpful to first consider the following.

Since the work of the French mathematician Fourier, it has been well-known that the response of a physical device or network to a single-valued periodic function may be expressed as an infinite series in trigonometric form. Each component of the series represents the response at a particular frequency and has a unique amplitude. Fourier devised a technique for obtaining the amplitudes for ech frequency component in this series. Conversely, if the amplitudes for each frequency are known (the composite for all frequencies being called the "spectral response"), it is possible to employ this technique in inverse fashion to find the periodic function which yields the desired spectral response. This is the principle upon which operation of device 10 is founded.

In order to find the tread pattern which yields the desired noise characteristics (which noise characteristics are a spectral response), device 10 first generates those noise characteristics in output spectrum generator 11. Fast Fourier transformer 12 generates the periodic function which yields the desired noise characteristics. Processing circuit 13 proportionally adjusts the magnitude of this periodic function such that its relative amplitude at various points in time throughout one period is directly proportional to the length of individual pitch elements at similarly spaced locations along the tire circumference. This having been done, one period of the periodic waveform displayed on display 33 may be divided into a plurality of equal segments equal in number to the number of individual pitch elements in the tread pattern. For example, if the tread pattern is to have 64 individual pitch elements, a single period of the waveform shown on display 33 is divided into 64 equal segments. The relative amplitude of the waveform at the point between each two segments is equal to the length of the pitch element at a similarly spaced location along the tire circumference.

In order to suitably proportionally adjust the magnitude of the periodic function generated by fast Fourier transformer 12, processing circuit 13 first insures that the magnitude of that signal is never negative. This is necessitated by the fact that all individual pitch elements must have a real (positive) finite length. Device 10 achieves this requirement by transposing waveform B by a value equal to its most negative value throughout one period. One exemplary manner of implementing this, detailed above with constant voltage source 20 and non-inverting amplifier 14, is by monitoring for and holding the greatest negative amplitude throughout one period, taking its absolute value and adding this constant voltage, referred to above as $K_1$, to waveform B.

If the individual pitch element lengths obtained from device 10 are to be of value, the sum of all such lengths must equal the desired tire circumference. Thus, processing circuit 13 must scale waveform C by some constant factor which will bring the sum of its relative amplitudes at the 64 points of interest to a value proportional and preferably equal to the magnitude of the desired tire circumference. This may be achieved by multiplying waveform C (including the desired relative pitch length information) by a ratio of numbers representing the desired tire circumference to the sum of the relative amplitudes of all points within a single period of waveform C (which represents the total relative pitch length necessary to generate the desired spectral response).

By integrating waveform C, integrator 30 obtains a voltage whose magnitude is proportional to the sum of the relative amplitudes of all points within a single period of waveform C. By adjusting potentiometer 31 to furnish a constant voltage whose magnitude is proportional to the desired tire circumference (which for purposes of discussion we shall let be 88 inches), divider 32 will divide the total relative pitch length into the desired tire circumference and furnish this constant voltage, previously referred to as $K_2$, to scaler 16. Scaler 16 multiplies waveform C by $K_2$ to yield the proportionally compressed waveform D, the sum of whose relative amplitudes at the designated points of interest, referred to hereinafter as the "sum of relative amplitudes," is equal to the desired tire circumference.

Design limitations for tires generally require that individual pitch lengths have a minimum finite length somewhat greater than zero inches, typically in the neighborhood of one-half inch. The transposition performed by constant voltage source 20 and non-inverting summing amplifier 14 leaves at least one point along waveform D with a magnitude of zero. The purpose of the introduction of constant voltage $K_3$ is to shift waveform D so that its minimum relative magnitude corresponds to the minimum desired pitch length (which for illustration may be taken as 0.6 inch).

Of course the introduction of a further shift in waveform D will disturb the proportional compression performed by constant voltage source $K_2$ and scaler 16 utilized to obtain a sum of relative amplitudes equal to the desired tire circumference. For this reason processing circuit 13 must perform one further scaling operation with the introduction of constant voltage $K_4$ similar to that described hereinbefore.

A single constant voltage $K_3$ must be selected such that after it is added to waveform D and the resulting waveform scaled by the sum of the relative amplitudes at the designated points of interest, the modified sum of relative amplitudes is equal to the desired tire circumference. Adding a constant voltage $K_3$ to waveform D will result in a modified sum of relative amplitudes according to the relation $$S_M = S_O + (P_N \times K_3) \qquad \text{Eq. 1}$$

where $S_M$ equals the modified sum of relative amplitudes; $S_O$ equals the original sum of relative amplitudes in waveform D; $P_N$ equals the desired number of individual pitch elements; and, $K_3$ is the constant added to each individual pitch element. After scaling, the smallest desired pitch length may be expressed as the constant $K_3$ times the ratio of the original sum of relative amplitudes in waveform D to the modified sum of relative amplitudes or $$P_{MIN} = K_3(S_O/S_M) \qquad \text{Eq. 2}$$

where $P_{MIN}$ equals the desired minimum pitch length; and $S_O$, $S_M$ and $K_3$ are as noted above.

Since the only unknowns in equations 1 and 2 are $K_3$ and $S_M$, equations 1 and 2 may be simultaneously solved to find their values. Substituting the values given above ($P_{MIN}=0.6$ inch; $S_O=88$ inches; and, $P_N=64$), $K_3$ is found to equal 1.064 and $S_M$ is found to equal 156.096.

A constant voltage proportional to 1.064 is added to waveform D by non-inverting summing amplifier 15. The output signal from non-inverting summing amplifier 15, depicted in FIG. 2 as waveform E, is multiplied by constant voltage $K_4$ from constant voltage source 24, which constant is proportional to the ratio $S_O/S_M$ (here, 88/156.096). The resultant output signal from scaler 17, shown in FIG. 2 as waveform F and displayed on display 33, possesses a relative amplitude at various points in time throughout one period that is proportional to the length of the individual pitch elements at similarly spaced locations over the preselected tire circumference.

Figure 3:
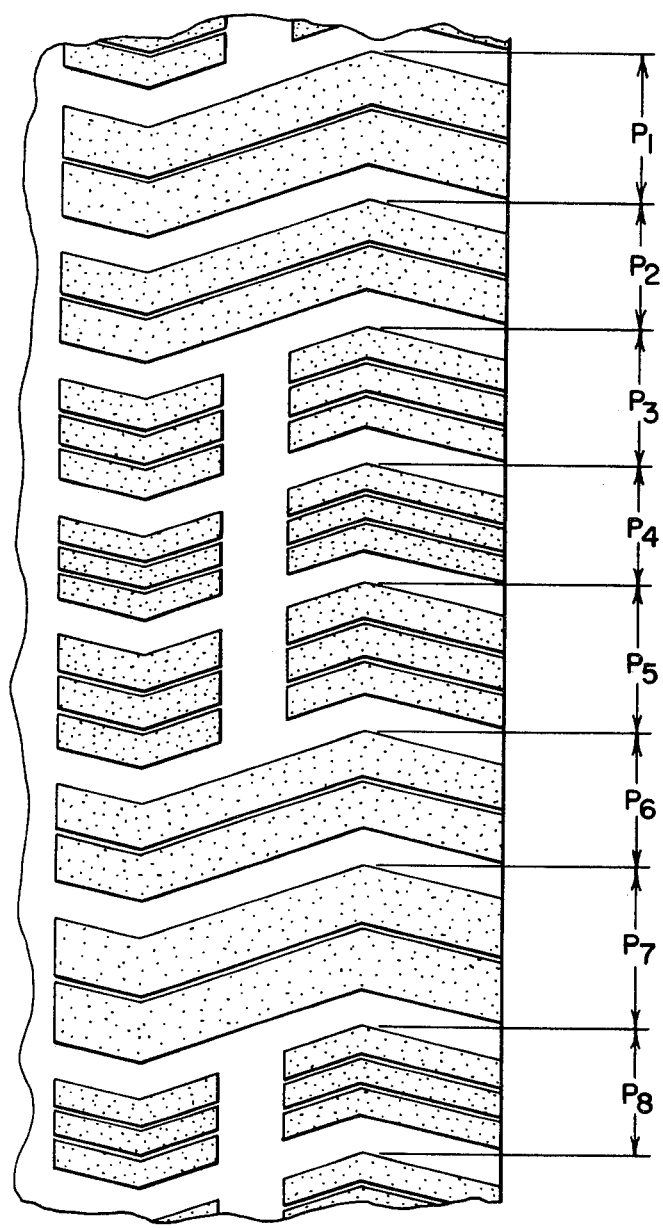
FIG. 3 is a partial tread pattern showing individual design elements of varying lengths.

The manner for obtaining the length for each pitch element may be best elucidated by referring to FIGS. 3 and 2(G). FIG. 3 depicts a portion of a tread pattern having a plurality of individual design elements (pitches) of varying lengths. Each pitch has been arbitrarily numbered and assigned a designation $P_1$ to $P_8$. FIG. 2(G) shows an enlarged view of that portion of waveform F near its origin.

Figure 4:
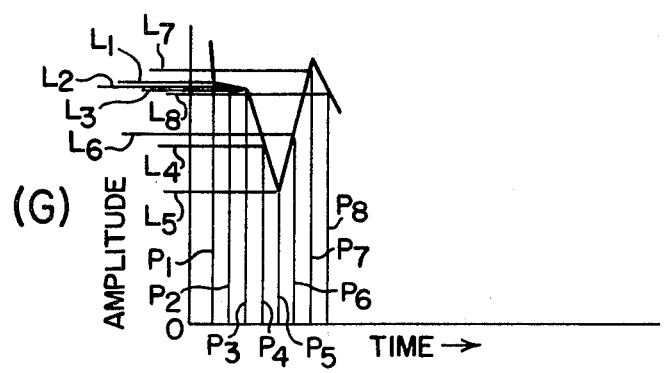
FIG. 4 is a schematic representation of the actual audio frequency spectrum signal obtained by the disclosed exemplary device in the example set forth below.
Figure 4:
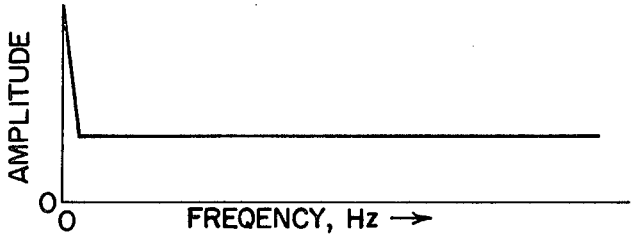

Initially one period of waveform F is marked off into 64 equal segments (64 pitches being desired in the example herein), the first eight segments being shown in FIG. 2(G). A vertical line may be scribed from the point between each two segments and the length of each pitch found from the relative amplitude of waveform F where intersected by the respective vertical line. Absolute magnitudes may be established from the point of least magnitude in waveform F, previously set by device 10 to represent the desired, preselected minimum pitch length of 0.6 inch. Assuming for the sake of discussion that the point in FIG. 2(G) associated with $P_5$ is the point of least magnitude in waveform F, the vertical distance from projection $L_5$ to the origin represents a length of 0.6 inch. Using this distance as a reference, the length for all pitches may be obtained from the indicated projections on the vertical amplitude axis for waveform F.

Where one is desirous for confirming that the overall configuration of the preselected audio frequency spectrum has been maintained notwithstanding processing by circuit 13, fast Fourier transformer 12 may be utilized to take the forward Fourier transform of waveform F. In the present instance the resulting audio frequency spectrum is illustrated in FIG. 4 and can be seen to exhibit the white-noise distribution that originally was set out to be obtained.

Although specific circuitry for generating constants $K_3$ and $K_4$ have not been shown, it will be understood by one of ordinary skill in the relevent arts that suitable voltage sources could be readily constructed in a similar manner to constant voltage sources 20 and 21 within the above-noted constraints. Those individuals should also recognize that numerous well-known techniques and circuits exist for generating of these constants and are acceptable for use herewith.

Inasmuch as the present invention is subject to many variations, modifications and changes in detail, a number of which have been expressly stated herein, it is intended that all matter described throughout this entire specification or shown in the accompanying drawings be interpreted as illustrative and not in a limiting sense. It should thus be evident that a device constructed, and a method operated according to the concept of the present invention, and reasonably equivalent thereto, will accomplish the objects of the present invention and otherwise substantially improve the art of producing pneumatic tires having preselected noise characteristics.

What is claimed is:

1. A device for producing a design element pattern of a preselected total length for a load supporting apparatus, the apparatus having a preselected, periodic audio frequency spectrum signal, the design element pattern including a plurality of individual design elements of varying lengths, the device comprising:

means for generating the preselected audio frequency spectrum signal;

means receiving the preselected, periodic audio frequency spectrum signal and generating an inverse Fourier transform signal thereof; and, circuit means receiving said inverse Fourier transform signal and generating a periodic signal the period of which is substantially proportional to the preselected total length for the design element pattern and the relative amplitude of which at various points in time throughout one period is substantially proportional to the length of the individual design elements at similarly spaced locations over the preselected total length for the design element pattern.

2. A device for producing a design element pattern of a preselected total length for a load supporting apparatus, the apparatus having a preselected, periodic audio frequency spectrum signal, the design element pattern including a plurality of individual design elements of varying lengths, the device comprising:

means for generating the preselected audio frequency spectrum signal;

means receiving the preselected, periodic audio frequency spectrum signal and generating an inverse Fourier transform signal thereof; and, circuit means receiving said inverse Fourier transform signal and generating a periodic signal the period of which is substantially proportional to the preselected total length for the design element pattern and the relative amplitude of which at various points in time throughout one period is substantially proportional to the length of the individual design elements at similarly spaced locations over the preselected total length for the design element pattern, said circuit means including first summing means receiving said inverse Fourier transform signal and adding a first constant to same to produce a first periodic output signal;

first scaling means receiving said first periodic output signal and multiplying same by a second constant to produce a second periodic output signal;

second summing means receiving said second periodic output signal and adding a third constant to same to produce a third periodic output signal; and second scaling means receiving said third periodic output signal and multiplying same by a fourth constant to produce said periodic signal whose amplitude at points throughout one period is substantially proportional to the length of individual design elements in the load supporting apparatus necesary for it to produce the preselected, periodic audio frequency spectrum signal.

3. A device, as set forth in claim 2, wherein said first summing means includes means for generating said first constant providing a voltage signal whose magnitude substantially equals the maximum voltage magnitude of said inverse Fourier transform signal in a polarity to be eliminated.

4. A device, as set forth in claim 3, wherein said first scaling means includes means for generating said second constant providing a voltage signal whose magnitude substantially equals a ratio of the preselected total length of the design element pattern to the sum of the lengths for each of the plurality of individual design elements.

5. A device, as set forth in claim 4, wherein said means for generating said first constant includes means for monitoring and holding the maximum negative amplitude of said inverse Fourier transform signal, and inverter means receiving and reversing the polarity of said maximum negative amplitude of said inverse Fourier transform signal, said first summing means further including summing amplifier means receiving from said inverter means said reversed polarity maximum negative amplitude of said inverse Fourier transform signal and adding the same to said inverse Fourier transform signal.

6. A device, as set forth in claim 5, wherein said means for generating said second constant includes integrator means receiving said first periodic output signal from said summing amplifier means and integrating the same, potentiometer means providing a preselected constant voltage substantially proportional to the preselected total length for the load supporting apparatus, and divider means receiving and dividing said output signal from said integrator means into said preselected constant voltage from said potentiometer means, and said first scaling means further including multiplier means receiving and multiplying said first periodic output signal from said summing amplifier means by said output from said divider means.

7. A device, as set forth in claim 4, further including means for generating said third constant providing a voltage signal simultaneously satisfying the following relations $$S_M = S_O + (P_N \times K_3)$$

$$P_{MIN} = K_3(S_O/S_M)$$

where $S_M$ equals the sum of the relative amplitudes at designated points in said third periodic output signal; $S_O$ equals the sum of the relative amplitudes at designated points in said second periodic output signal; $P_N$ equals the desired number of individual design elements; $K_3$ equals said third constant; and, $P_{MIN}$ equals the desired minimum individual design element length.

8. A device, as set forth in claim 1, wherein the load supporting apparatus is a pneumatic tire, the design element pattern is a tread design pattern, the preselected total length for the load supporting apparatus is the circumference of the pneumatic tire, the periodic audio freqency spectrum signal is the noise spectrum signal for the pneumatic tire, and the plurality of individual design elements are a plurality of individual tread pitch elements.

9. A method for generating a design element pattern of a preselected total length for a load supporting apparatus, the apparatus having a preselected, periodic audio frequency spectrum signal, the design element pattern including a plurality of individual design elements of varying lengths, comprising the steps of:
generating the preselected audio frequency spectrum signal;
generating an inverse Fourier transform signal of the preselected, periodic audio frequency spectrum signal; and,
proportionally adjusting said inverse Fourier transform signal such that its signal has a period substantially proportional to the preselected total length for the design element pattern and has a relative amplitude at various points in time throughout one period that is substantially proportional to the length of the individual design elements at similarly spaced locations over the preselected total length for the design element pattern.

10. A method for generating a design element pattern of a preselected total length for a load supporting apparatus, the apparatus having a preselected, periodic audio frequency spectrum signal, the design element pattern including a plurality of individual design elements of varying lengths, comprising the steps of:
generating the preselected audio frequency spectrum signal;
generating an inverse Fourier transform signal of the preselected, periodic audio frequency spectrum signal; and,
proportionally adjusting said inverse Fourier transform signal such that its signal has a period substantially proportional to the preselected total length for the design element pattern and has a relative amplitute at various points in time throughout one period that is substantially proportional to the length of the individual design elements at similarly spaced locations over the peselected total length for the design element pattern,
said step of proportionally adjusting including the steps of
transposing said inverse Fourier transform signal such that its polarity remains constant;
scaling said transposed inverse Fourier transform signal to produce a first periodic output signal;
summing said first periodic output signal with a first constant signal to produce a second periodic output signal and,
scaling said second periodic output signal by a second constant to produce said adjusted inverse Fourier transform signal whose amplitude at points throughout one period is substantially proportional to the length of individual design elements in the load supporting apparatus necessary for it to generate the preselected, periodic audio frequency spectrum signal.

11. A method, as set forth in claim 10, wherein said step of transposing said inverse Fourier transform signal includes the step of adding a third constant signal whose magnitude substantially equals the maximum magnitude of said inverse Fourier transform signal in a polarity to be eliminated.

12. A method, as set forth in claim 11, wherein said step of scaling said inverse Fourier transform signal includes the step of multiplying said inverse Fourier transform signal by a fourth constant signal whose magnitude substantially equals a ratio of the preselected total length of the design element pattern to the sum of the lengths for each of the plurality of individual design elements.

13. A method, as set forth in claim 12, wherein said step of adding a third constant includes the steps of monitoring and holding the maximum negative amplitude of said inverse Fourier transform signal, reversing the polarity of said maximum negative amplitude of said inverse Fourier transform signal, and, adding said reversed polarity signal to said inverse Fourier transform signal.

14. A method, as set forth in claim 13, wherein said step of multiplying by a fourth constant includes the steps of integrating said inverse Fourier transform signal, providing a preselected, constant voltage proportional to the preselected total length for the load supporting apparatus, dividing said integrated inverse Fourier transform signal into said preselected, constant voltage, and multiplying said inverse Fourier transform signal by said divided output signal.

15. A method, as set forth in claim 12, wherein said step of generating said first constant includes the step of providing a voltage signal that simultaneously satisfies the following relations $$S_M = S_O + (P_N \times K_1)$$

$$P_{MIN} = K_1(S_O/S_M)$$

where $S_M$ equals the sum of the relative amplitudes at designated points in said second periodic output signal; $S_O$ equals the sum of the relative amplitudes at designated points in said first periodic output signal; $P_N$ equals the desired number of individual design elements; $K_1$ equals said first constant; and, $P_{MIN}$ equals the desired minimum individual design element length.

16. A method for generating a tire design pattern for a pneumatic tire of a preselected circumference, the pneumatic tire having a preselected, periodic noise spectrum signal, the tire design pattern including a plurality of individual tread pitch elements of varying lengths, comprising the steps of:
generating the preselected noise spectrum signal;
generating an inverse Fourier transform signal of the preselected, periodic noise spectrum signal; and,
proportionally adjusting said inverse Fourier transform signal such that its signal has a period substantially proportional to the circumference of the pneumatic tire and has a relative amplitude at various points in time throughout one period that is substantially proportional to the length of the individual tread pitch elements at similarly spaced locations over the circumference of the pneumatic tire.

* * * * *